Nov. 24, 1925.

F. H. STANWOOD

PEDAL COVER

Filed Nov. 20, 1923

1,562,993

Inventor:-
Frank H. Stanwood
By:- Munday, Clarke & Carpenter
Attys.

Patented Nov. 24, 1925.

1,562,993

UNITED STATES PATENT OFFICE.

FRANK H. STANWOOD, OF WILMETTE, ILLINOIS, ASSIGNOR TO STANWOOD EQUIPMENT COMPANY, OF CHICAGO, ILLINOIS, A CORPORATION OF ILLINOIS.

PEDAL COVER.

Application filed November 20, 1923. Serial No. 675,798.

To all whom it may concern:

Be it known that I, FRANK H. STANWOOD, a citizen of the United States, residing in Wilmette, in the county of Cook and State of Illinois, have invented a new and useful Improvement in Pedal Covers, of which the following is a specification.

My present invention relates to covers for accelerator pedals, or the like, and particularly to a rubber covering providing a non-slipping tread surface.

Accelerator and clutch pedals frequently become heated to such an extent as to cause discomfort to the driver, particularly in the case of a lady driver wearing thin-soled shoes, and it is an important object of this invention to provide a pedal covering of non-heat-conducting character.

It is also an object of the invention to provide a pedal covering of this character which is adapted to be easily positioned upon the pedal and is of simple and economical form.

Other objects and advantages of the invention will be apparent as it is better understood from the following description, which, taken in connection with the accompanying drawings, discloses a preferred embodiment thereof.

Referring to the drawings.

Figure 1:
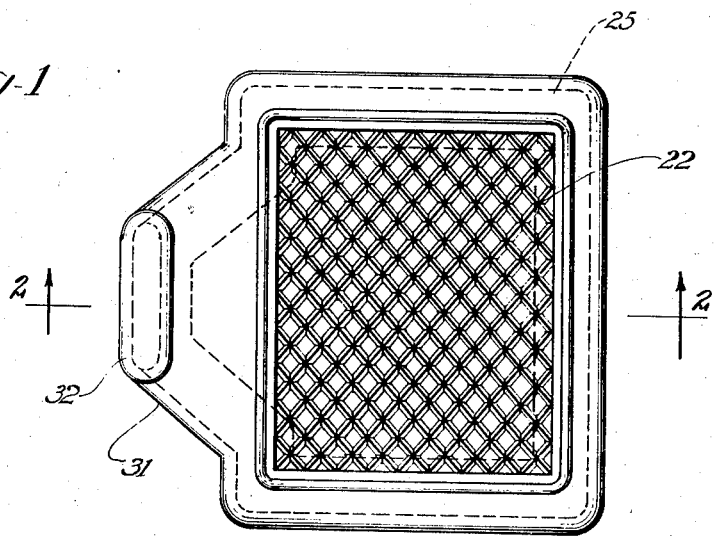
Figure 1 is a plan view of a pedal cover in which my invention is embodied.
Figure 2:
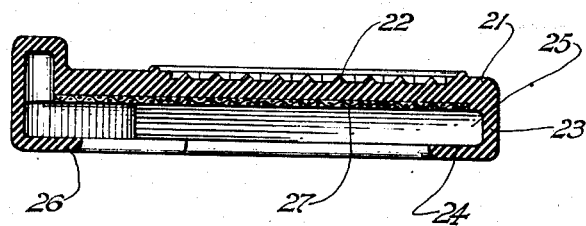
Fig. 2 is a cross-sectional view thereof, taken substantially on the line 2—2 of Fig. 1.

The pedal cover shown on the drawings for purposes of illustration comprises a tread member 21, of rubber or like material, provided with a ribbed surface 22, of any suitable or preferred design, said member having a depending flange 23 which is under-cut, as indicated at 24, to provide an interior peripheral groove 25 adapted to receive the edge of the pedal to hold the cover in place. The inwardly extending flange portion 26 is of such elasticity as to be readily flexed to permit positioning of the cover upon the pedal and it is of such resiliency as to firmly grip the under side of the pedal to prevent easy displacement, or relative movement of the cover.

A layer of asbestos, or like material, indicated by the reference character 27, is embedded in the bottom of the cover and is adapted to contact with the top of the pedal, thereby preventing the heat from said pedal being conducted through the rubber to the foot of the driver. This protective material may be molded with the rubber and may thus be securely positioned without any additional operations and, therefore, does not add materially to the cost of production.

The exact shape of the cover, of course, must conform to the pedal upon which it is to be used, the one shown in the drawing having a side extension 31 provided with an upstanding lug 32, which prevents the foot from slipping sidewise, this form being particularly adapted to the Lafayette car.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A cover for accelerator pedals, or the like, comprising a molded rubber tread member having a retaining flange, and a layer of non-heat-conducting material on the under side of said tread member.

2. A cover for accelerator pedals, or the like, comprising a molded rubber tread member having a retaining flange, and a layer of asbestos on the under side of said tread member.

3. A cover for accelerator pedals, or the like, comprising a molded rubber tread member having a retaining flange, and having non-heat-conducting material molded therein to protect the foot of the driver from a heated pedal.

4. A cover for accelerator pedals, or the like, comprising a molded rubber tread member having a retaining flange, and having asbestos molded therein to protect the foot of the driver from a heated pedal.

5. A cover for accelerator pedals, or the like, comprising a tread member having a non-slipping upper surface and an undercut peripheral flange adapted to engage the edge of the pedal, and a non-heat-conducting lining on the under side of said tread member.

6. A cover for accelerator pedals, or the like, comprising a tread member having a non-slipping upper surface and an undercut peripheral flange adapted to engage the edge of the pedal, and a layer of non-heat-conducting material incorporated in said tread member.

FRANK H. STANWOOD.